United States Patent [19]

Ito et al.

[11] Patent Number: 5,506,917
[45] Date of Patent: Apr. 9, 1996

[54] THRESHOLDING METHOD FOR SEGMENTING GRAY SCALE IMAGE, METHOD FOR DETERMINING BACKGROUND CONCENTRATION DISTRIBUTION, AND IMAGE DISPLACEMENT DETECTION METHOD

[75] Inventors: Minoru Ito; Toshifumi Watanabe, both of Kanagawa, Japan

[73] Assignee: Nippon Telegraph and Telephone Corporation, Tokyo, Japan

[21] Appl. No.: 728,587

[22] Filed: Jul. 11, 1991

[30] Foreign Application Priority Data

| Jul. 13, 1990 | [JP] | Japan | 2-186851 |
| Jul. 13, 1990 | [JP] | Japan | 2-186852 |
| Jul. 13, 1990 | [JP] | Japan | 2-186853 |

[51] Int. Cl.$^6$ ................................. G06K 9/36
[52] U.S. Cl. ........................ 382/271; 382/272
[58] Field of Search ................... 382/9, 51, 52, 382/53, 18, 270, 271, 272, 273; 358/465, 464, 466, 465; G06K 9/34, 9/38; H04N 1/40

[56] References Cited

U.S. PATENT DOCUMENTS

| 4,446,486 | 5/1984 | Itoh | 382/53 |
| 4,731,863 | 3/1988 | Sezan | 382/51 |
| 4,905,294 | 2/1990 | Sugiura et al. | 382/9 |
| 4,907,286 | 3/1990 | Yamada | 382/51 |
| 4,941,190 | 7/1990 | Joyce | 382/52 |
| 5,121,224 | 6/1992 | Ng et al. | 382/9 |
| 5,138,671 | 8/1992 | Yokoyama | 382/51 |

Primary Examiner—Yon J. Couso
Attorney, Agent, or Firm—Oblon, Spivak, McClelland, Maier, & Neustadt

[57] ABSTRACT

In a thresholding method for segmenting gray scale image which is less dependent on the concentration distribution of the input image, the threshold in determined as a zero-cross point of a histogram difference between the concentration histograms for the gray scale image within the window at a window position at which the window contains more high concentration region and at a window position at which the window contains more low concentration region. Also, in a method of determining a background concentration distribution from an image having an arbitrarily distributed pattern, the background concentration level is determined as a peak concentration or a mean value concentration of a low concentration section of the histogram difference of the concentration histograms for two associated windows. Also. in an image displacement detection method capable of detecting a displacement of a pattern in a two dimensional image accurately by using only a one-dimensional pattern matching without any period mismatching error even for an image of a repetitious pattern, the discplacements in the vertical and lateral direction which are locally minimum and for which a discrepancy in an oblique direction is minimum are selected as the actual displacements.

18 Claims, 15 Drawing Sheets

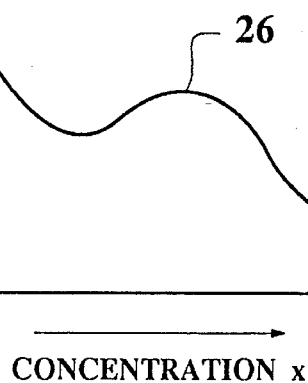
FIG.11 (A)
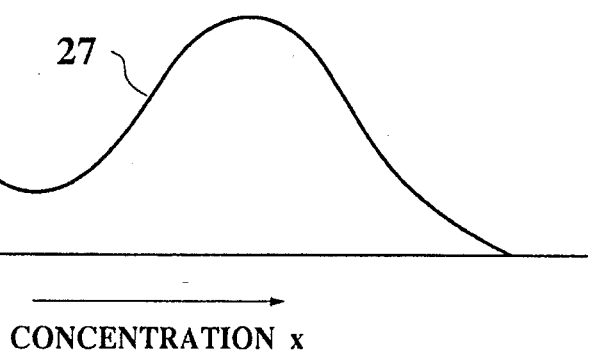
FIG.11 (B)
FIG.12
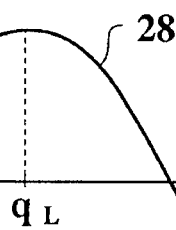

THRESHOLDING METHOD FOR SEGMENTING GRAY SCALE IMAGE, METHOD FOR DETERMINING BACKGROUND CONCENTRATION DISTRIBUTION, AND IMAGE DISPLACEMENT DETECTION METHOD

BACKGROUND OF THE INVENTION

1. Field of the Invention

The present invention relates to a thresholding method for segmenting gray scale images and a method for determining a background concentration distribution in such an image processing as pattern matching and pattern checking, and also to an image displacement detection method in an image processing of image alignment for patterns such as an LSI pattern, letter pattern, and print pattern.

2. Description of the Background Art

Conventionally, as a thresholding method based on the concentration distribution which is to be utilized in the pattern matching and pattern checking by a computer, a p-tile method and a mode method are known.

The p-tile method is a method in which a threshold is selected to be such a concentration value by which a cumulative concentration distribution of the input image calculated sequentially from the lowest concentration value reaches to a prescribed value p.

However, this p-tile method has a limitation in that the prescribed value p must be known in advance so that it cannot be utilized as a general thresholding method. Thus, in order for this p-tile method to be applicable, it is necessary that there exists a standard pattern to be compared with, a positional relationship of the input image and the standard pattern is already known, and the input pattern does not include any defect or excessive pattern.

The mode method is a method in which a threshold is determined to be a concentration value corresponding to a valley of a presumed bimodal concentration distribution for the input image.

This mode method is capable of determining the threshold in a case the pattern portion and the background portion have the similar shape of the concentration distribution and occupy approximately the same area, but is unable to obtain the appropriate threshold otherwise because the valley of the bimodal concentration distribution shifts its position toward the portion occupying the smaller area as the ratio of the occupied areas deviates from a value of 1:1.

In addition, as a general thresholding method, there is a discriminant analysis method in which a threshold is determined to be a concentration value at which a separability of the concentration distribution in a case of dividing the concentration distribution into two becomes maximum.

However, this discriminant analysis method has the problem similar to the mode method described above in that it is unable to obtain the appropriate threshold in a case other than that in which the pattern portion and the background portion have the similar shape of the concentration distribution and occupy the approximately the same area, because the separability deteriorates significantly when the area occupied by the pattern portion is small.

Now, the shading correction for the image showing the LSI pattern utilizes the knowledge of the background concentration distribution, and this background concentration distribution has conventionally been determined by using a method in which the background concentration distribution is determined by inputting an image of the background only, so that this method depends on a unique characteristic of the image input device.

On the other hand, there is also known a method of determining the background concentration distribution which depends on the pattern distribution in the input image. In this method, the background concentration distribution is determined by distinguishing the pattern portion and the background portion in the input image and obtaining the concentration distribution of the background portion only, so that it is necessary for the background portion to be distinguishable from the pattern portion.

However, in a case of a scanning electron microscope (SEM) image of an LSI wafer, there is a fluctuation in the background concentration distribution in correspondence with the pattern distribution because of the charging up by the electrons, so that there is a need for performing the shading correction in the image processing of the pattern portion recognition. Yet, the shading correction requires the knowledge of the background concentration distribution which cannot be obtained without the knowledge of the pattern portion recognition conventionally.

Now, as a conventional image displacement detection method for detecting a displacement of an image for patterns such as an LSI pattern, a letter pattern, and a print pattern, a local correlation method has been known.

In this local correlation method, a local image obtained from the standard image is utilized as a template, and the correlation value is calculated as this template is moved over the image, such that the displacement is detected by taking a state of matching for which the correlation value becomes maximum.

There are further propositions to reduce an amount of calculation involved by changing the definition of the correlation function. In this respect, the SSDA method can also be regarded as one variation or modification of the correlation method.

As a method of significantly reducing an amount of calculation in the correlation method, there is a proposition for utilizing cumulative projection patterns on the input image along two directions. Such a proposition can be found in Japanese Patent Application 2-18899 in which this method is used as a preliminary adjustment to be used in conjunction with some other fine adjustment.

However, this method of cumulative projection pattern comparison has the problem of a possibility for a period mismatching error to occur in dealing with the repetitious pattern image.

Such a period mismatching error occurs for example for a case of pattern matching a designed reference pattern (standard pattern) 1 shown in FIG. 1(A) and an observed LSI pattern (object pattern) 2 shown in FIG. 1(B), where it is assumed that the image displacement correction for the observed pattern 2 is already made. In the cumulative projection pattern comparison method, the image displacement correction is determined according to an X-direction cumulative projection pattern 3 and a Y-direction cumulative projection pattern 4 for the designed reference pattern 1 as well as an X-direction cumulative projection pattern 5 and a Y-direction cumulative projection pattern 6 for the observed pattern 2. In this example, the X-direction cumulative projection patterns 3 and 5 completely coincide with each other and the Y-direction cumulative projection patterns 4 and 6 also completely coincide with each other, so that according to the cumulative projection pattern comparison method it is concluded that the observed pattern 2 of FIG. 1(B) is identical to the designed reference pattern 1 of FIG. 1(A), which is apparently false as can be seen in FIGS. 1(A) and 1(B). This false result is obtained because of the period mismatching error which cannot be discerned from the data on the X- and Y-direction cumulative projection patterns alone.

Here, it is possible to detect this occurrence of the period mismatching error by taking the correlation from the superposition of the designed reference pattern 1 and the observed pattern 2, but the inclusion of such an additional operation causes the significant increase of the amount of calculation, and this in turn obliterates the most advantageous feature of the cumulative projection pattern comparison method. Thus, this method has not been applicable for the image of a repetitious pattern.

SUMMARY OF THE INVENTION

It is therefore an object of the present invention to provide a thresholding method for segmenting gray scale images which is less dependent on the concentration distribution of the input image.

It is another object of the present invention to provide a method of determining a background concentration distribution from an image having an arbitrarily distributed pattern.

It is also an object of the present invention to provide an image displacement detection method capable of detecting a displacement of a pattern in a two dimensional image accurately by using only a one-dimensional pattern matching, without any period mismatching error even for an image of a repetitious pattern.

According to one aspect of the present invention there is provided a thresholding method for segmenting a gray scale image, comprising the steps of: (a) scanning the gray scale image with a window over successive window positions; (b) calculating a concentration level of the gray scale image within the window at each of the successive window positions in the scanning of the step (a); (c) obtaining concentration histograms for the gray scale image within the window at the window position at which the concentration level satisfies a prescribed upper level condition and at the window position at which the concentration level satisfies a prescribed lower level condition; (d) obtaining a histogram difference of the concentration histograms obtained at the step (c); (e) determining a zero-cross point of the histogram difference obtained at the step (d); and (f) segmenting the input image by using the zero-cross point determined at the step (e) as a threshold to obtain a segmented image.

According to another aspect of the present invention there is provided a thresholding method for segmenting a gray scale image, comprising the steps of: (a) scanning the gray scale image with two windows over successive window positions; (b) obtaining concentration histograms for the gray scale image within each of said two windows at each window position; (c) obtaining a histogram difference of the concentration histograms for the two windows at said each window position obtained at the step (b); (d) determining a zero-cross point of the histogram difference obtained at the step (c); and (e) segmenting the input image by using the zero-cross point determined at the step (d) as a local threshold for said each window position.

According to another aspect of the present invention there is provided a method of determining a background concentration distribution for a gray scale image, comprising the steps of: (a) scanning the gray scale image with two windows over successive window positions; (b) obtaining concentration histograms for the gray scale image within each of said two windows at each window position; (c) obtaining a histogram difference of the concentration histograms for said two windows at said each window position obtained at the step (b); (d) determining one of a peak concentration and a mean value concentration of a low concentration section of the histogram difference obtained at the step (c); (e) determining a background concentration level for said each window position from said one of the peak concentration and the mean value concentration determined at the step (d); and (f) constructing a background concentration distribution map from the background concentration levels determined at the step (e).

According to another aspect of the present invention there is provided a method of detecting a displacement of an observed image with respect to a reference image in vertical and lateral directions, comprising the steps of: (a) obtaining a vertical cumulative projection pattern with respect to the vertical direction for each of the observed image and the reference image, and a lateral cumulative projection pattern with respect to the lateral direction for each of the observed image and the reference image; (b) obtaining candidate vertical displacements $\Delta x$ of the observed image with respect to the reference image in the vertical direction for which a vertical discrepancy between the vertical cumulative projection patterns for the observed image and the reference image is locally minimum, and candidate lateral displacements $\Delta y$ of the observed image with respect to the reference image in the lateral direction for which a lateral discrepancy between the lateral cumulative projection patterns for the observed image and the reference image is locally minimum; (c) obtaining an oblique cumulative projection pattern with respect to an oblique direction for each of the observed image and the reference image; (d) calculating an estimated oblique displacement $\Delta z$ from each of the candidate vertical displacements $\Delta x$ and each of the candidate lateral displacements $\Delta y$ obtained at the step (b); (e) adjusting the oblique cumulative projection pattern for the observed image by the estimated oblique displacement $\Delta z$ calculated at the step (d) to obtain an adjusted oblique cumulative projection pattern: (f) obtaining an oblique discrepancy between the oblique cumulative projection pattern for the reference image and the adjusted oblique cumulative projection pattern for the observed image; and (g) determining the displacement in the vertical and lateral directions as one of the candidate vertical displacements $\Delta x$ and one of the candidate lateral displacements $\Delta y$ for which the oblique discrepancy obtained at the step (f) satisfies a prescribed condition.

According to another aspect of the present invention there is provided a method of detecting a displacement of an observed image with respect to a reference image in vertical and lateral directions, comprising the steps of: (a) obtaining a vertical cumulative projection pattern with respect to the vertical direction for each of the observed image and the reference image, a lateral cumulative projection pattern with respect to the lateral direction for each of the observed image and the reference image, and an oblique cumulative projection pattern with respect to an oblique direction for each of the observed image and the reference image; (b) obtaining candidate vertical displacements $\Delta x$ of the observed image with respect to the reference image in the vertical direction for which a vertical discrepancy between the vertical cumulative projection patterns for the observed image and the reference image is locally minimum, candidate lateral displacements $\Delta y$ of the observed image with respect to the reference image in the lateral direction for which a lateral discrepancy between the lateral cumulative projection patterns for the observed image and the reference image is locally minimum, candidate oblique displacements Δz of the observed image with respect to the reference image in the oblique direction for which a oblique discrepancy between the oblique cumulative projection patterns for the observed image and the reference image is locally minimum; (c) calculating an estimated oblique displacement Δz from each of the candidate vertical displacements Δx and each of the candidate lateral displacements Δy obtained at the step (b); (d) obtaining one of the candidate oblique displacements Δz obtained at the step (b) which is closest to the estimated oblique displacement Δz calculated at the step (c); (e) calculating a function of a distance between said one of the candidate oblique displacements Δz obtained at the step (d) and the estimated oblique displacement Δz calculated at the step (c) as an evaluation value for said one of the candidate oblique displacements Δz obtained at the step (d); and (f) determining the displacement in the vertical and lateral directions as one of the candidate vertical displacements Δx and one of the candidate lateral displacements Δy for which the evaluation value calculated at the step (e) for a corresponding candidate oblique displacement Δz satisfies a prescribed condition.

Other features and advantages of the present invention will become apparent from the following description taken in conjunction with the accompanying drawings.

BRIEF DESCRIPTION OF THE DRAWINGS

FIGS. 11(A) and 11(B) are concentration histograms for the left and right windows of FIG. 8(B) occupying a relatively larger area of low and high concentration regions respectively.

FIG. 12 is a histogram difference obtained from the concentration histograms shown in FIGS. 11(A) and 11(B).

DETAILED DESCRIPTION OF THE PREFERRED EMBODIMENTS

Figure 2:
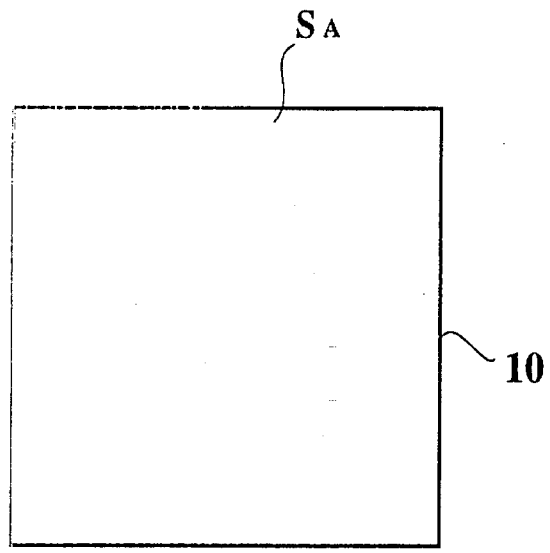
FIG. 2(A) is an illustration of a window to be utilized in one embodiment of a thresholding method according to the present invention.
FIG. 2(B) is an illustration of the window of FIG. 2(A) placed over a gray scale image having high and low concentration regions.
Figure 2:
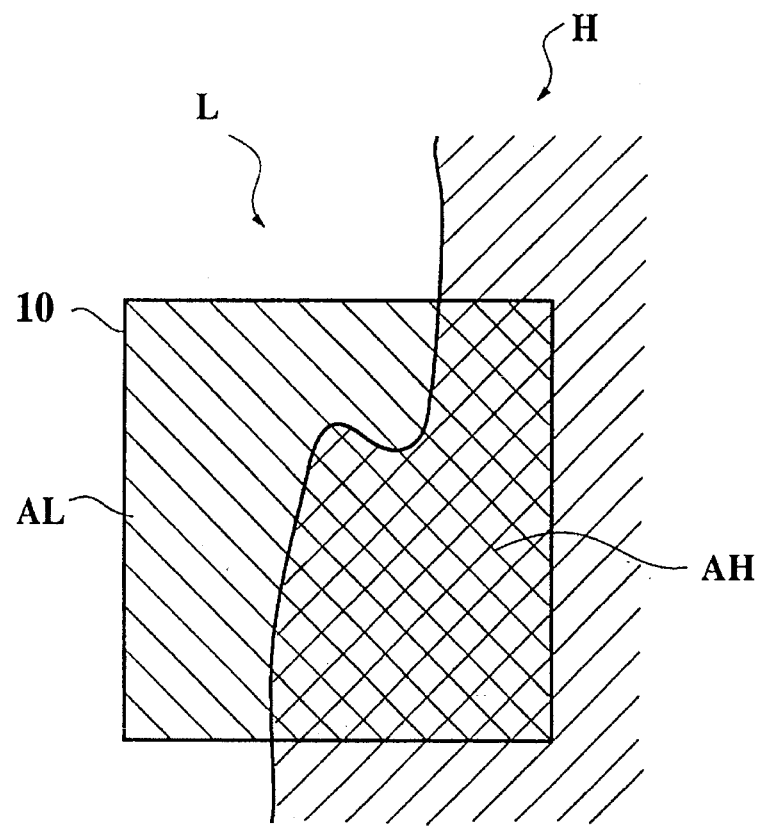

Referring now to FIGS. 2(A) and 2(B), one embodiment of a thresholding method for segmenting gray scale images according to the present invention will be described in detail.

In this embodiment, a window 10 shown in FIG. 2(A) which has an area equal to $S_A$ will be utilized. Here, a shape of the window 10 can be arbitrary and not necessarily be limited to a square shape shown in FIG. 2(A).

This window 10 is placed over a gray scale image as shown in FIG. 2(B) where the gray scale image includes a high concentration region H corresponding to a binary level "1" which represents a pattern portion and a low concentration region L corresponding to a binary level "0" which represents a background portion. Also, the high concentration region contained within the window 10 is designated as a high level region AH while the low concentration region contained within the window 10 is designated as a low level region AL.

Figure 3:
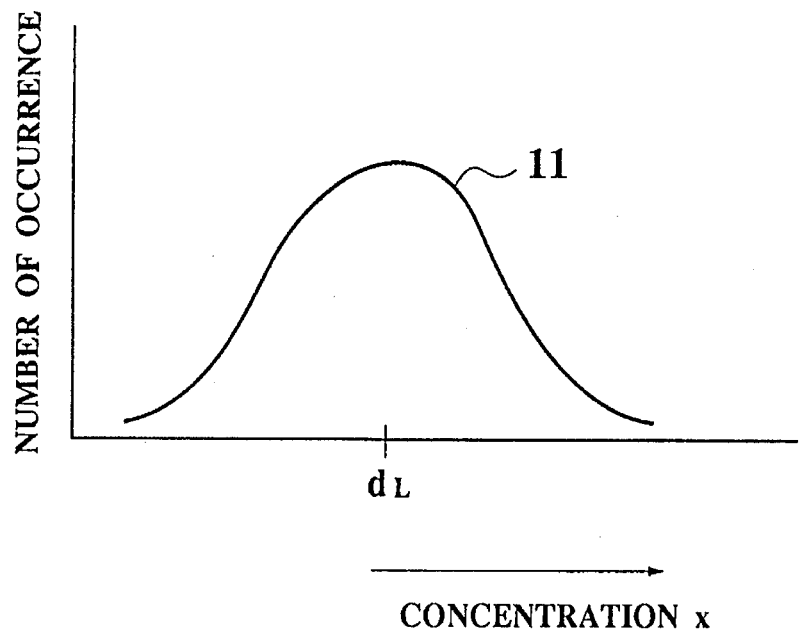
FIGS. 3(A) and 3(B) are concentration histograms for the low and high concentration regions within the window shown in FIG. 2(B) respectively.
Figure 3:
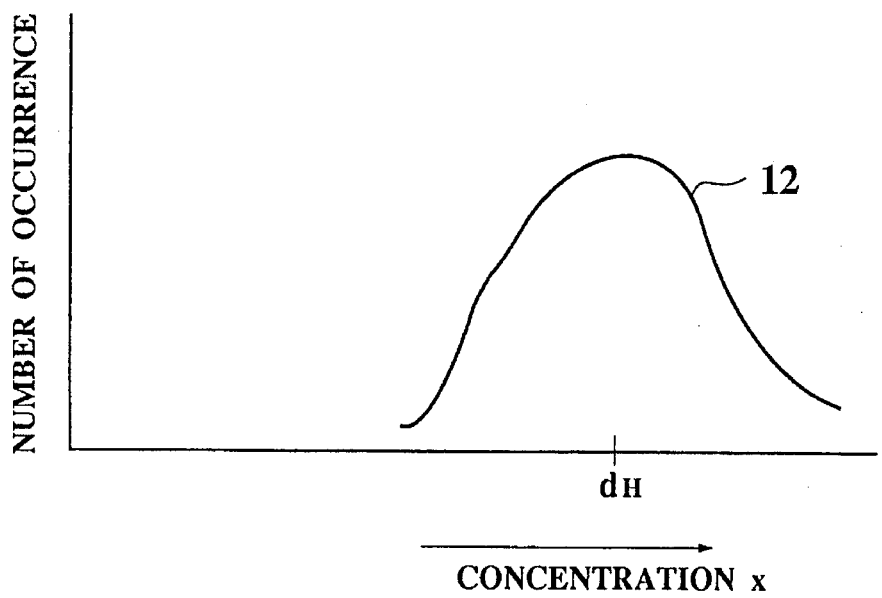

The concentration histogram for the low level region AL is given by a curve 11 shown in FIG. 3(A) which is in a form of a Gaussian distribution centered around a mean level $d_L$ with a variance equal to $\sigma^2$ due to noises. On the other hand, the concentration histogram for the high level region AH is given by a curve 12 shown in FIG. 3(B) which is in a form of a Gaussian distribution centered around a mean level $d_H$ with a variance equal to $\sigma^2$ due to noises.

These distribution curves 11 and 12 for the concentration histograms of FIGS. 3(A) and 3(B) can be expressed by the following expressions, respectively:

$$e^{-(x-d_L)^2/\sigma^2}$$

and $$e^{-(x-d_H)^2/\sigma^2}$$

where x denotes a variable for a concentration value.

Now, when the window 10 contains both the low level region AL and the high level region AH as shown in FIG. 2(B), the concentration histogram f for the entire window 10 can be expressed as follows:

$$f = S_{ALe}^{-(x-d_L)^2/\sigma^2} + S_{AHe}^{-(x-d_H)^2/\sigma^2}$$

where $S_{AL}$ and $S_{AH}$ are the areas of the low level region AL and the high level region AH, respectively. Here, it is noted that when the entire image is scanned by this window 10, $S_{AH}$ will be relatively larger than $S_{AL}$ if the mean concentration or total concentration sum within the window 10 is large, whereas $S_{AL}$ will be relatively larger than $S_{AH}$ if the mean concentration or total concentration sum within the window 10 is small.

Denoting a value of $S_{AL}$ in a case $S_{AL}$ is larger by $S_{ALp}$ and a value of $S_{AL}$ in a case $S_{AH}$ is larger by $S_{ALq}$, a histogram difference $\Delta f$ of the concentration histograms in these two cases can be expressed as follows:

$$\begin{aligned}\Delta f &= S_{ALp}e^{-(x-d_L)^2/\sigma^2} + (S_A - S_{ALp})e^{-(x-d_H)^2/\sigma^2} - \\ &\quad \{S_{ALq}e^{-(x-d_L)^2/\sigma^2} + (S_A - S_{ALq})e^{-(x-d_H)^2/\sigma^2}\} \\ &= (S_{ALp} - S_{ALq})(e^{-(x-d_L)^2/\sigma^2} - e^{-(x-d_H)^2/\sigma^2})\end{aligned}$$

As can be seen from this expression, the histogram difference $\Delta f$ takes a value equal to zero when $S_{ALp}=S_{ALq}$ but this condition can easily be avoided by appropriately adjusting the window positions in the window scanning procedure, so that by excluding that possibility, the concentration value x for which $\Delta f=0$ can be given as $x=(d_L+d_H)/2$, which is the desirable threshold.

Figure 4:
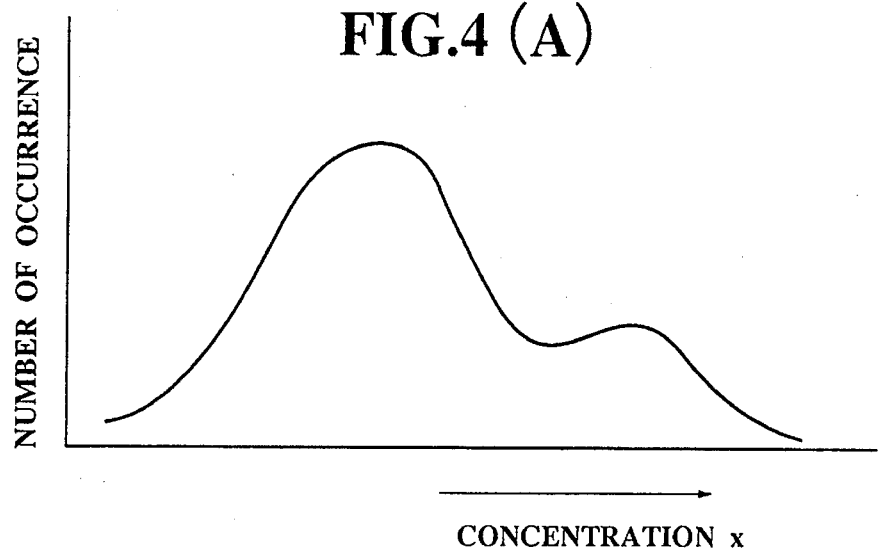
FIGS. 4(A) and 4(B) are concentration histograms for the window occupying a relatively larger area of low and high concentration regions respectively.
Figure 4:
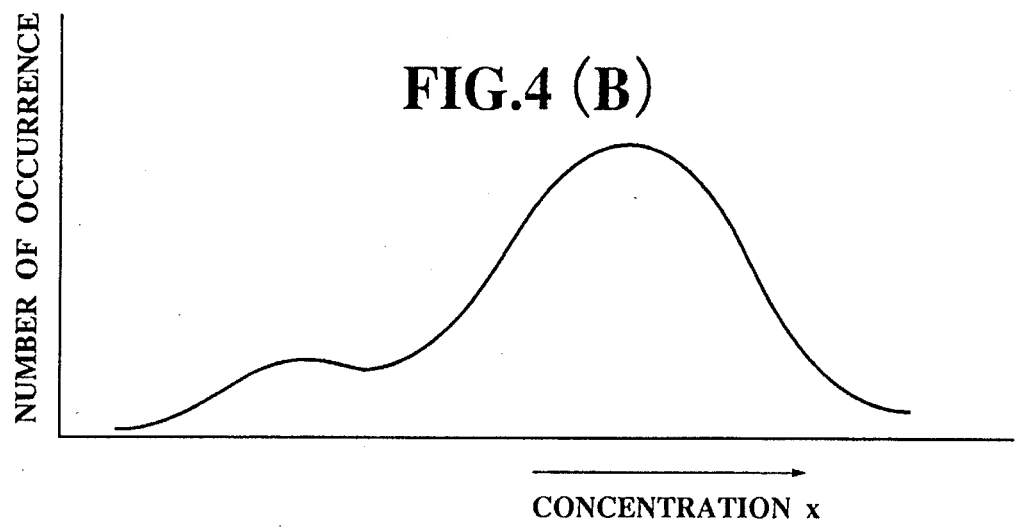
Figure 5:
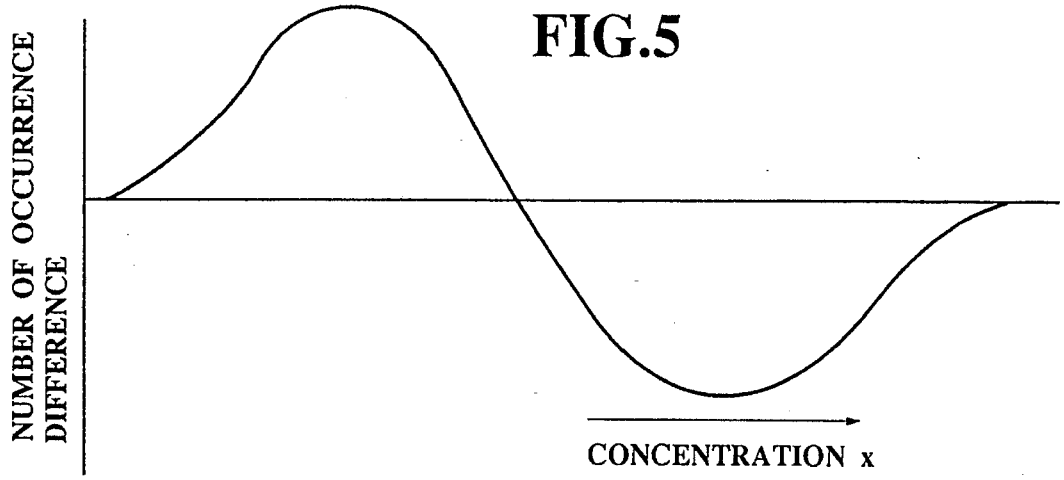
FIG. 5 is a histogram difference obtained from the concentration histograms shown in FIGS. 4(A) and 4(B).

In a case $S_{AL}$ is larger, the concentration histogram for the entire window 10 appears as shown in FIG. 4(A), whereas in a case $S_{AH}$ is larger, the concentration histogram for the entire window 10 appears as shown in FIG. 4(B), and the histogram difference $\Delta f$ of the concentration histograms in these two cases appears as shown in FIG. 5. In this FIG. 5, the negative and positive areas under the curve below and above the horizontal axis are always the same and a zero-cross point at which the curve crosses the horizontal axis is an appropriate threshold for which $\Delta f=0$.

Thus, by determining the threshold to be a zero-cross point in the histogram difference of the concentration diagrams for two cases described above, the appropriate threshold can be obtained.

The threshold so determined does not depend on the ratio of the pattern region and background region in the input image, as it is determined from the histogram difference of the two concentration histograms obtained at two positions with larger pattern region and larger background region, without directly using the concentration histogram for the entire input image. Although there are obvious exceptions of cases involving the entirely pattern region image or entirely background region image, these exceptional cases can easily be excluded by appropriately adjusting the window positions in the scanning procedure, so that this method is practically applicable to any gray scale image.

Here, it is to be noted that in a case the zero-cross point is not so clearly determinable as a result of a presence of a noise such that the curve for the histogram difference is not as smooth as that shown in FIG. 5 in a vicinity of the zero-cross point, the zero-cross point may be approximated by a center of gravity of the negative and positive areas in the histogram difference which may be used as the appropriate threshold instead.

Similarly, the zero-cross point may be approximated by a symmetrical point of the histogram difference which may be used as the appropriate threshold.

Also, in a case the curve for the histogram difference is crossing a zero level at more than one points as a result of a presence of a noise, the zero-cross point may be approximated by a middle point of a distribution of the points at which the curve for the histogram difference is croosing the zero level in the histogram difference.

Moreover, the zero-cross point may be determined after the curve for the histogram difference is approximated by using such a curve approximation method as a moving average, a polynomial approximation, and a line approximation in a vicinity of the zero-cross point.

It is also to be noted that the determination of the zero-cross point can be achieved at higher accuracy when an area for $|\Delta f|$ is larger, so that the two positions of the window 10 for obtaining the concentration histograms from which the histogram difference $\Delta f$ is to be obtained are idealistically corresponding to the cases of the maximum and minimum image concentrations within the window 10. However, in practice, the appropriate zero-cross point can easily be determined by using two cases in which either one of $S_{AL}$ and $S_{AH}$ occupies more than a half of $S_A$.

Figure 6:
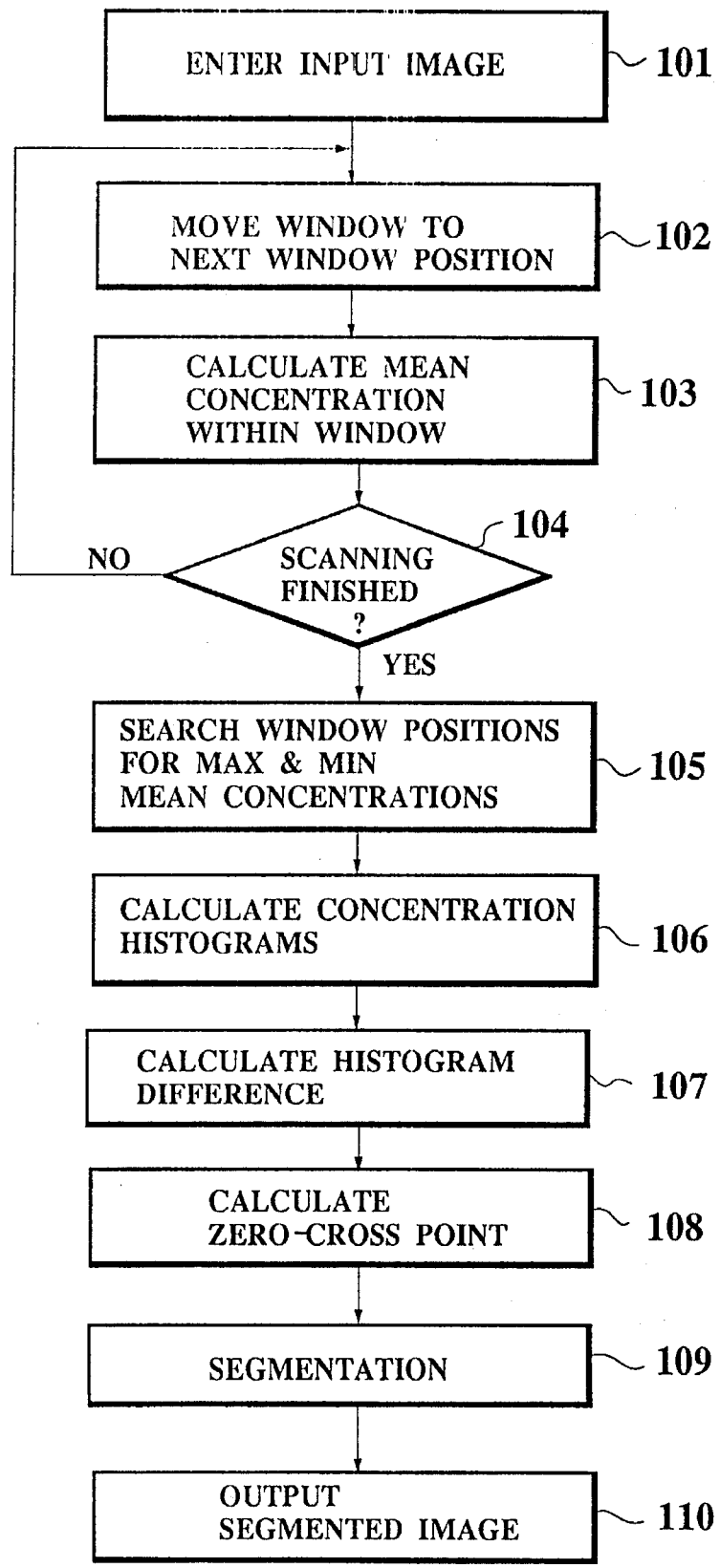
FIG. 6 is a flow chart of one possible procedure for one embodiment of a thresholding method according to the present invention.

The thresholding method described above can be carried out according to a procedure represented by the flow chart of FIG. 6, as follows.

First, the input image to be segmented is entered at the step 101.

Then, the window of the predetermined size and shape is moved over the input image at the step 102, and the mean concentration within the window at that position is calculated at the step 103. This process of the steps 102 and 103 are repeated for all the predetermined window positions over the input image, until it is judged that the scanning is completed at the step 104.

Next, two window positions at which the mean concentration takes the maximum and minimum values are searched out at the step 105. Then, the concentration histogram is obtained for each of these two window positions at the step 106, the histogram difference of these concentration histograms for these two window positions is calculated at the step 107, and the zero-cross point in the calculated histogram difference of these concentration histograms is calculated and taken as the threshold at the step 108.

Finally, at the step 109, the input image is segmented by using the threshold calculated at the step 108, and the resulting segmented image is outputted at the step 110.

Figure 7:
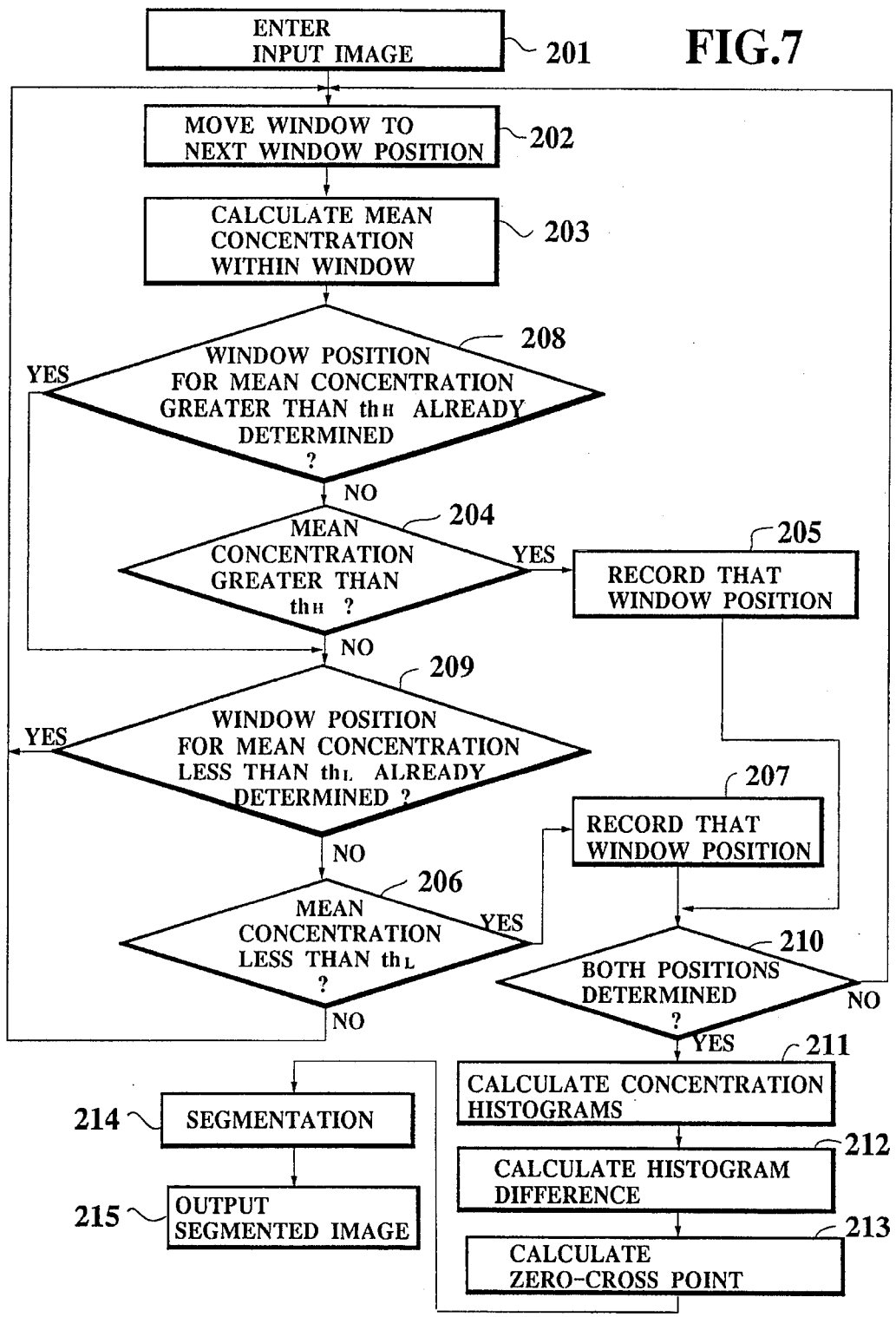
FIG. 7 is a flow chart of another possible procedure for one embodiment of a thresholding method according to the present invention.

Alternatively, the thresholding method described above can also be carried out according to a procedure represented by the flow chart of FIG. 7, in which the processing time is shortened by stopping the scanning as soon as the calculation of the threshold becomes possible, as follows.

First, the input image to be segmented is entered at the step 201.

Then, the window of the predetermined size and shape is moved over the input image at the step 202, and the mean concentration within the window at that position is calculated at the step 203. When this mean concentration is judged to be greater than a prescribed critical threshold value $th_H$ for the region containing the larger pattern region AH at the step 204 next, then this window position is recorded at the step 205. On the other hand, when this mean concentration is judged to be less than a prescribed critical threshold value $th_L$ for the region containing the larger background region AL at the step 206 next, then this window position is recorded at the step 207. This process is repeated until it is judged at the step 210 that two window positions are determined at the steps 204 and 206. Here, in repetition, the step 204 will be skipped when the window position with the mean concentration greater than $th_H$ is judged to be already determined at the step 208 immediately preceding the step 204, while the step 206 will be skipped when the window position with the mean concentration less than $th_L$ is judged to be already determined at the step 209 immediately preceding the step 206.

Then, the concentration histogram is obtained for each of these two window positions at the step 211, the histogram difference of these concentration histograms for these two window positions is calculated at the step 212, and the zero-cross point in the calculated histogram difference of these concentration histograms is calculated and taken as the threshold at the step 213.

Finally, at the step 214, the input image is segmented by using the threshold calculated at the step 213, and the resulting segmented image is outputted at the step 215.

In this procedure, the concentration histogram for each of the recorded window positions may be obtained as soon as this position is determined, and may be stored along with the window positions.

It is also to be noted that in the two procedures described above, the total concentration sum within the window may be used instead of the mean concentration.

Figure 8:
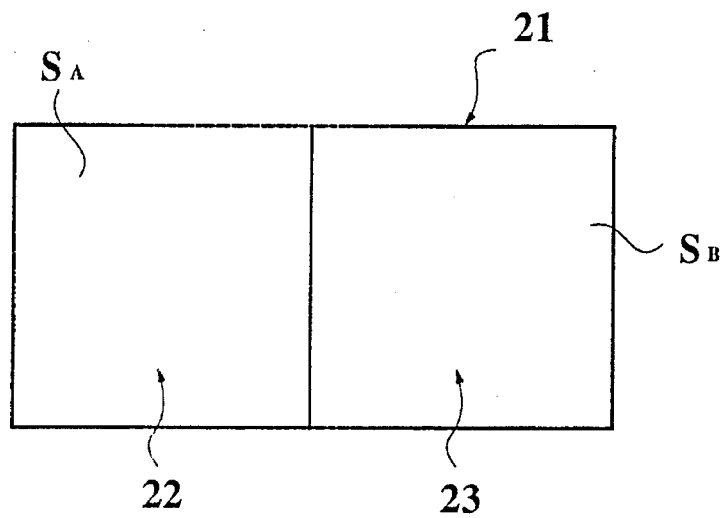
FIG. 8(A) is an illustration of a window to be utilized in another embodiment of a thresholding method as well as in one embodiment of a method for determining a background concentration distribution according to the present invention.
FIG. 8(B) is an illustration of the window of FIG. 8(A) placed over a gray scale image having high and low concentration regions.
Figure 8:
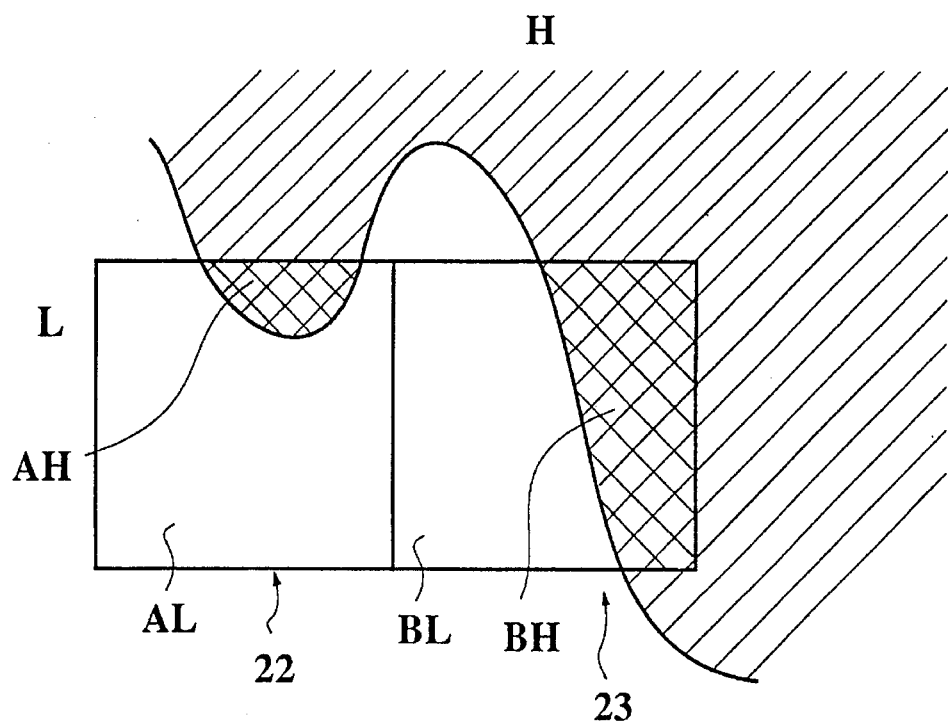

Referring now to FIGS. 8(A) and 8(B), another embodiment of a thresholding method for segmenting gray scale images according to the present invention will be described in detail. This embodiment can be considered as a modification of the above described thresholding method which is adapted to deal with the local variation of the threshold.

In this embodiment, a window 21 shown in FIG. 8(A) which is divided into a left window 22 and a right window 23 is utilized. A region occupied by the left window 22 will be designated as A and has an area equal to $S_A$, while a region occupied by the right window 23 will be designated as B and has an area equal to $S_B$. Here, the shapes of the window 21, left window 22, and right window 23 can be arbitrary and not necessarily be limited to the rectangular shapes shown in FIG. 8(A). Also, the left and right windows 22 and 23 may not necessarily be arranged side by side as shown in FIG. 8(A), and can be stacked up in a vertical direction, or made to be partially overlapping with each other, or else arranged to be located in a vicinity of each other. In fact, according to the experiments conducted by the present inventors, improved results were obtainable by using windows which are separated by a distance corresponding to one or more picture elements from each other.

This window 21 is placed over a gray scale image as shown in FIG. 8(B) where the gray scale image includes a high concentration region H corresponding to a binary level "1" which represents a pattern region and a low concentration region L corresponding to a binary level "0" which represents a background region. Also, the high concentration region contained within the left window 22 is designated as a left high level region AH while the low concentration region contained within the left window 22 is designated as a left low level region AL, and the high concentration region contained within the right window 23 is designated as a right high level region BH while the low concentration region contained within the right window 23 is designated as a right low level region BL.

Now, in this embodiment, the concentration histograms for the left and right windows 22 and 23 at each window position are used in places of the concentration histograms for two window positions of the window used in the previous embodiment, and the threshold determined from the zero-cross point of the histogram difference obtained from these two concentration histograms for the left and right windows 22 and 23 is taken as a local threshold appropriate for that window position. In other words, at each window position the concentration histograms are obtained for the left and right windows 22 and 23, and the histogram difference of these concentration histograms is obtained, and then the zero-cross point of that histogram difference is determined as a local threshold appropriate for that window position.

Thus, by determining the threshold to be a zero-cross point in the histogram difference of the concentration diagrams for two windows at a particular window position, the appropriate local threshold for that particular window position can be obtained, just as in a case of obtaining an overall threshold in the previous embodiment.

The local threshold obtained by this embodiment of the thresholding method is particularly useful for an image in which the background concentration distribution is unclear, such as a scanning electron microscope (SEM) image in which the background concentration largely depends on the pattern distribution because of the influence due to the charging up of the electrons.

Figure 9:
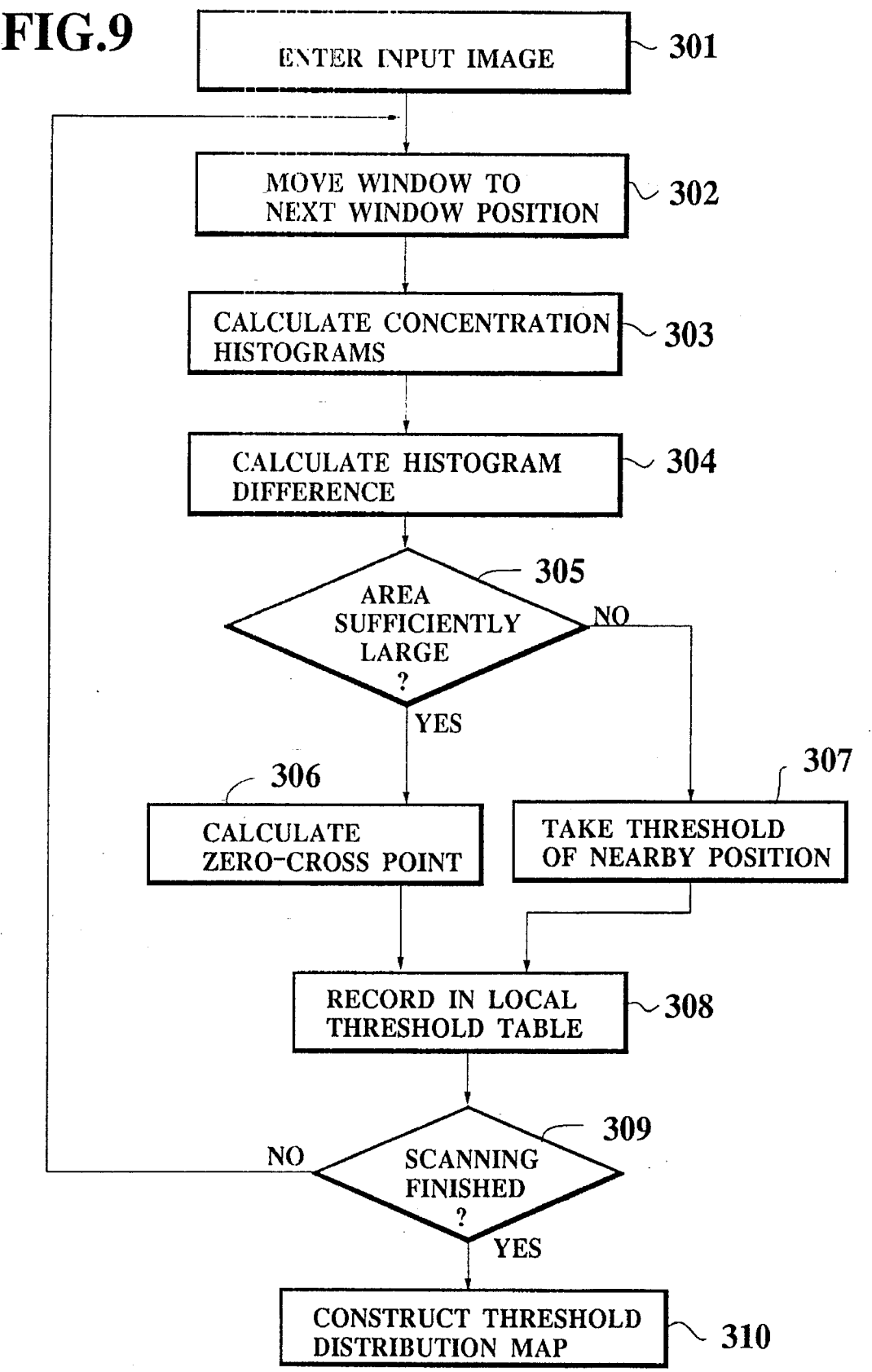
FIG. 9 is a flow chart of one possible procedure for one embodiment of a thresholding method according to the present invention.
Figure 10:
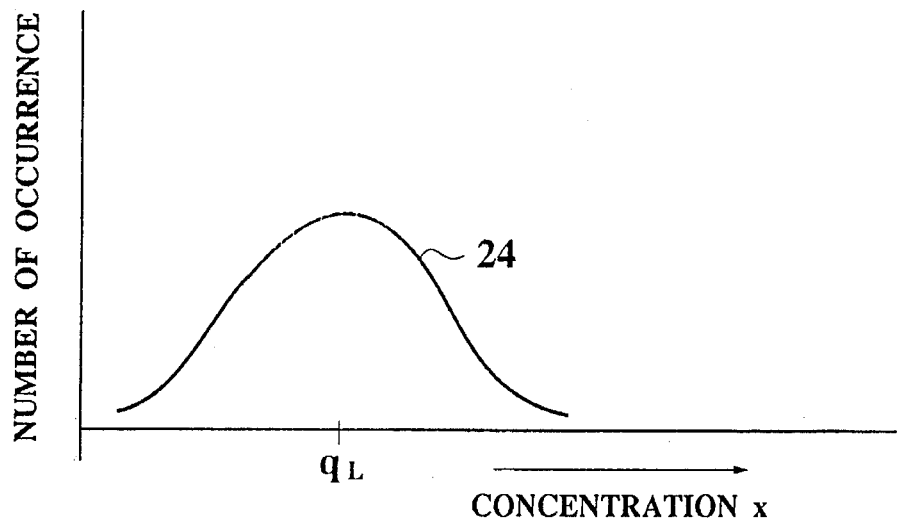
FIGS. 10(A) and 10(B) are concentration histograms for the low and high concentration regions within the window shown in FIG. 8(B) respectively.
Figure 10:
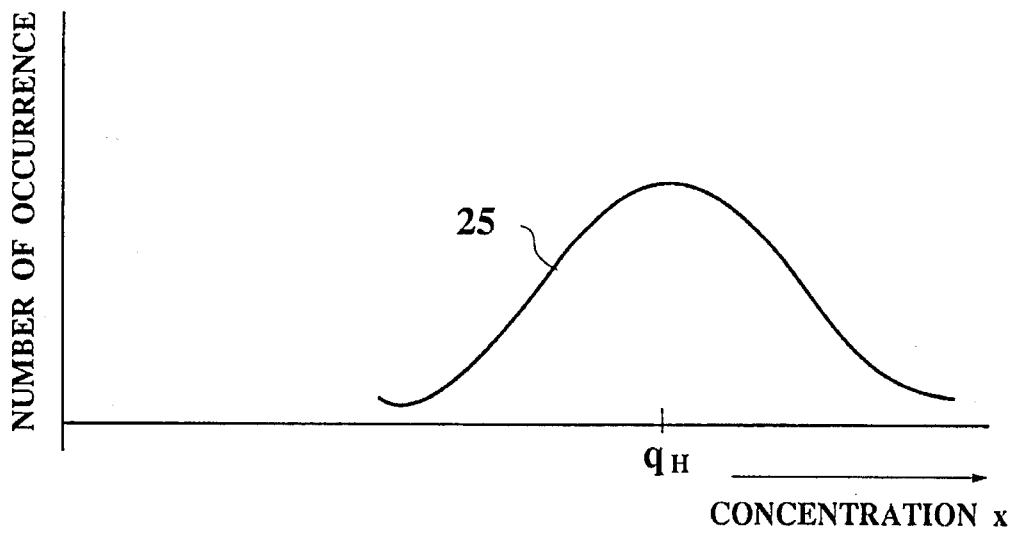

The thresholding method of this embodiment can be carried out according to a procedure represented by the flow chart of FIG. 9, as follows.

First, the input image to be segmented is entered at the step 301.

Then, the window 21 of the predetermined size and shape is moved over the input image at the step 302, the concentration histograms for the left and right windows 22 and 23 at a particular window position are calculated at the step 303, and the histogram difference of these concentration histograms for the left and right windows 22 and 23 is calculated at the step 304.

Then, whether the area under the curve of the histogram difference is sufficiently large to obtain the appropriate threshold or not is determined at the step 305.

When it is judged that the area under the curve of the histogram difference is sufficiently large, the zero-cross point in the calculated histogram difference is calculated and taken as the local threshold for that particular window position at the step 306.

On the other hand, when it is judged that the area under the curve of the histogram difference is not sufficiently large, the local threshold for that particular window position is set equal to the previously determined local threshold for an adjacent window position at the step 307.

Then, the local threshold determined at the step 306 or the step 307 is recorded in a local threshold table at the step 308.

This process of the steps 302 to 308 is repeated for all the predetermined window positions over the input image, until it is judged that the scanning is completed at the step 309.

Finally, at the step 310, the local threshold distribution map is constructed according to the local threshold recorded in the local threshold table at the step 308, such that the input image can be segmented by using the constructed local threshold distribution map.

Referring now to FIG. 10(A) to FIG. 12, one embodiment of a method of determining a background concentration distribution according to the present invention will be described in detail.

This embodiment also utilizes the window 21 shown in FIG. 8(A) utilized in the previous embodiment, where this window 21 is divided into a left window 22 and a right window 23. A region occupied by the left window 22 will be designated as A and has an area equal to $S_A$, while a region occupied by the right window 23 will be designated as B and has an area equal to $S_B$. Here, again, the shapes of the window 21, left window 22, and right window 23 can be arbitrary and not necessarily be limited to a rectangular shape as shown in FIG. 8(A). Also, as before, the left and right windows 22 and 23 may not necessarily be arranged side by side as shown in FIG. 8(A), and can be stacked up in a vertical direction, or made to be partially overlapping with each other, or else arranged to be located in a vicinity of each other. In fact, according to experiments conducted by the present inventors, improved results were obtainable by using windows which are separated by one or more picture elements from each other.

As in the previous embodiment, this window 21 is placed over a gray scale image as shown in FIG. 8(B) where the gray scale image includes a high concentration region H corresponding to a binary level "1" which represents a pattern region and a low concentration region L corresponding to a binary level "0" which represents a background region. Also, the high concentration region contained within the left window 22 is designated as a left high level region AH while the low concentration region contained within the left window 22 is designated as a left low level region AL, and the high concentration region contained within the right window 23 is designated as a right high level region BH while the low concentration region contained within the right window 23 is designated as a right low level region BL.

Now, this embodiment of a method of determining a background concentration distribution substantially differs from the previous embodiment of a thresholding method for segmenting gray scale images in a manner of utilizing these left and wight windows 22 and 23 as follows.

The concentration histogram for the background portion is given by a curve 24 shown in FIG. 10(A) which is in a form of a Gaussian distribution centered around a mean level $q_L$ with a variance equal to $\sigma^2$ due to noises, while the concentration histogram for the pattern portion is given by a curve 25 shown in FIG. 10(B) which is in a form of a Gaussian distribution centered around a mean level $q_H$ with a variance equal to $\sigma^2$ due to noises. Here, $q_L$ and $q_H$ are values generally applicable to a region around the window, which depend on the positions of the window and are unknown.

The concentration histogram for the region A occupied by the left window 22 is given by a curve 26 shown in FIG. 11(A), while the concentration histogram for the region B occupied by the right window 23 is given by a curve 27 shown in FIG. 11(B), where the peaks of the curves 26 and 27 do not necessarily correspond to the mean levels of the pattern portion and background portion.

The histogram difference obtained from the concentration histograms of FIGS. 11(A) and 11(B) is given by a curve 28 shown in FIG. 12.

These distribution curves 26 and 27 for the concentration histograms of the background portion and the pattern portion can be expressed by the following expressions, respectively:

$$e^{-(x-q_L)^2/\sigma^2}$$

and $$e^{-(x-q_H)^2/\sigma^2}$$

where x denotes a variable for a concentration value, while the concentration histogram for the region A of the left window 22 can be expressed as follows:

$$S_{AL}e^{-(x-q_L)^2/\sigma^2}+(S_A-S_{AL})e^{-(x-q_H)^2/\sigma^2}$$

where $S_{AL}$ is the area of the left low level region AL, and the concentration histogram for the region B of the right window 23 can be expressed as follows:

$$S_{BL}e^{-(x-q_L)^2/\sigma^2}+(S_B-S_{BL})e^{-(x-q_H)^2/\sigma^2}$$

where $S_{BL}$ is the area of the right low level region BL.

The histogram difference of the concentration histograms for the regions A and B can be expressed as follows:

$$(S_{AL}-S_{BL}\cdot S_A/S_B)(e^{-(x-q_L)^2/\sigma^2}-e^{-(x-q_H)^2/\sigma^2})$$

where the concentration histogram of the pattern portion has been multiplied by $S_A/S_B$ before taking the difference.

As can be seen from this expression, the histogram difference takes a value equal to zero when $S_{AL}=S_{BL}\cdot S_A/S_B$ and this corresponds to a case in which both of the regions A and B are occupied by either the high concentration region H or the low concentration region L. When both of the regions A and B are occupied by the low concentration region L, a peak value or the statistical mean value of the curve 26 for the concentration histogram of the region A can be taken as the background concentration level.

On the other hand, when $S_{AL}\neq S_{BL}\cdot S_A/S_B$, the curve 28 for the histogram difference is proportional to the difference between the curve 24 for the concentration histogram of the background portion and the curve 25 for the concentration histogram of the pattern portion. The $q_L$ is given by a peak value or a statistical mean value for a low concentration section of the curve 28 for the histogram difference, and can be taken as the background concentration level in such a case.

The $q_L$ so determined may take a value smaller than a correct value when the concentration histograms for the background portion and the pattern portion have large variances and at the same time the difference between the $q_L$ and $q_H$ is small. However, even when the correct value for $q_L$ varies at different positions of the window, the difference between $q_L$ and $q_H$ remains unchanged, and therefore the difference between the obtained value and the correct value for $q_L$ is always constant regardless of the position of the window. Thus, the obtained value $q_L$ can be adjusted appropriately by providing an off-set $\Delta q$, where this off-set $\Delta q$ is determined at any one window position as a difference between the value of $q_L$ obtained at that position and the value of $q_L$ obtained at a nearby position at which $S_{AL}=S_{BL}\cdot S_A/S_B$.

Thus, the background concentration can be determined at any position except where both of the left and right windows 22 and 23 are occupied by the pattern region. As a result, the background concentration distribution can be determined directly from the input image itself, without relying upon the prior knowledge of the pattern distribution.

As a consequence, it becomes possible in this embodiment to calculate the shading correction function on a basis of the background concentration distribution obtained from the input image, such that the problem associated with the scanning electron microscope (SEM) image of an LSI wafer due to a fluctuation in the background concentration distribution in correspondence with the pattern distribution because of the charging up by the electrons can be resolved.

It is also to be noted that the method of determining a background concentration level described above can also be applied as a method of determining a pattern portion concentration level by using a high concentration section of the histogram difference instead of a low concentration section of the histogram difference. It is further possible to calculate the pattern portion concentration level from the background concentration level determined by the method of determining the background concentration level described above, or to calculate the background concentration level from the pattern portion concentration level determined by the method of determining the pattern portion concentration level just described.

Figure 13:
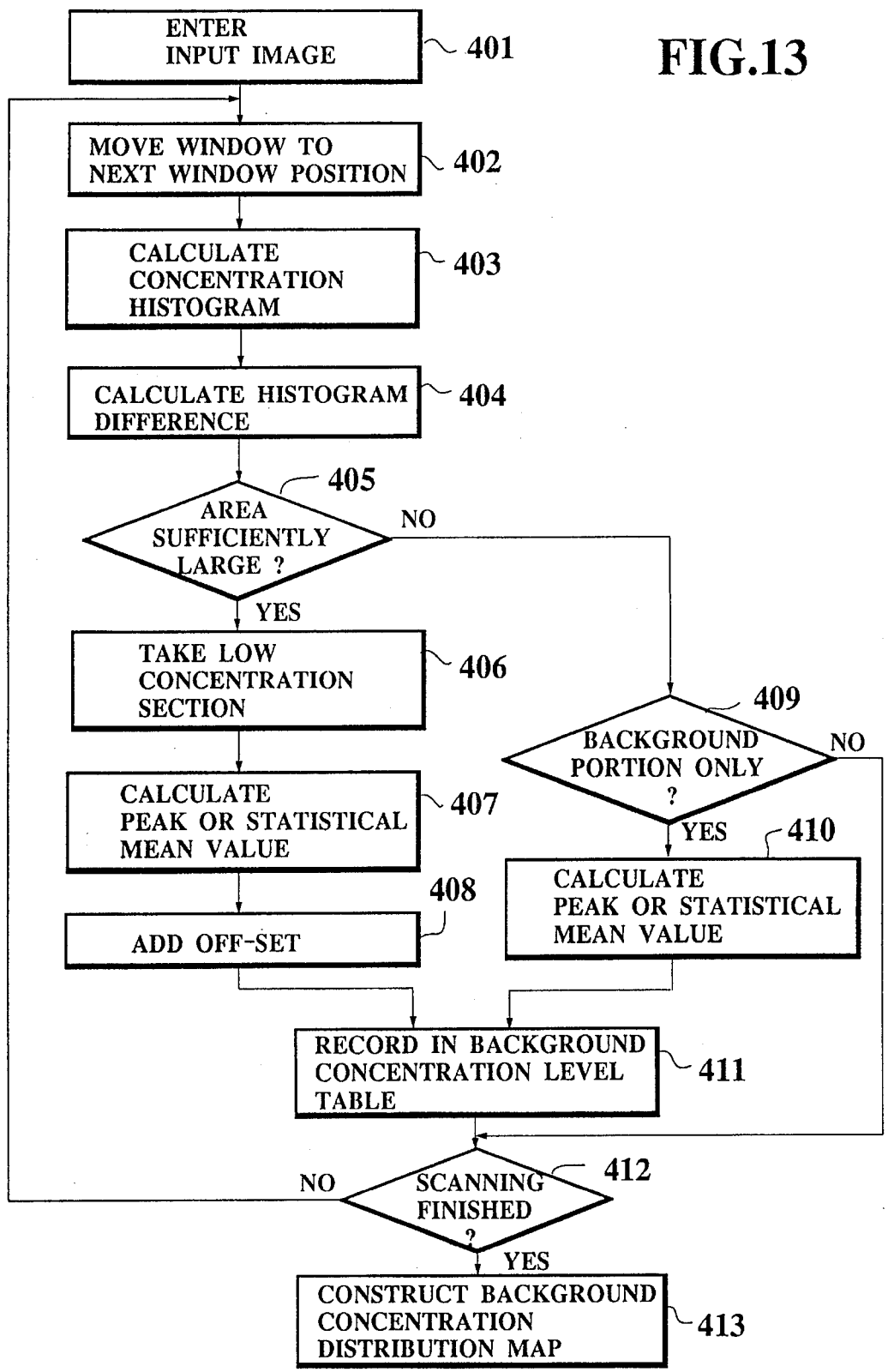
FIG. 13 is a flow chart of one possible procedure for one embodiment of a method for determining a background concentration distribution according to the present invention.

The method of determining background concentration level described above can be carried out according to a procedure represented by the flow chart of FIG. 13, as follows.

First, the input image to be segmented is entered at the step 401.

Then, two windows of the predetermined size and shape are moved over the input image at the step 402, and the concentration histograms 24 and 25 are obtained for these two windows at the step 403, the histogram difference 28 of these concentration histograms for these two windows is calculated at the step 404, and whether the sum of the absolute values of the histogram difference (i.e., the area under the curve) is smaller than a prescribed value (or equal to zero) is judged at the step 405 in order to determine whether the histogram difference has a sufficient area to obtain the appropriate background concentration level.

When it is determined that the histogram difference has a sufficient area to obtain the appropriate background concentration level at the step 405, the low concentration section of the histogram difference is taken out at the step 406, and the peak value or the statistical mean value for the low concentration section of the histogram difference is calculated at the step 407. Then, at the step 408, the off-set $\Delta q$ calculated in advance is added to the value obtained at the step 407, and the resulting value is recorded in a background concentration level table at the step 411 and whether the scanning by the windows is finished or not is determined at the step 412.

On the other hand, when it is determined that the histogram difference does not have a sufficient area to obtain the appropriate background concentration level at the step 405, whether the region occupied by the windows is entirely the background portion only or not is determined at the step 409 from the mean value of the concentration histograms for the windows.

If the region occupied by the windows is not entirely the background portion only, then the peak value or the statistical mean value of the histogram difference is calculated at the step 410 and the obtained value is recorded in the background concentration level table at the step 411, whereas otherwise the step 412 will be taken to be next.

When it is determined that the scanning by the windows is not finished at the step 412, then the process returns to the step 402 to repeat the subsequent steps for the next window position, whereas otherwise the background concentration distribution map is constructed at the step 413 by using the background concentration levels recorded in the background concentration level table.

In this procedure described above, the window may be moved from one position to the next position in a unit of a prescribed number of picture elements. When this unit is taken large the processing time can be shortened, but the resulting background concentration distribution map will inevitably be rough at the same time.

Figure 1:
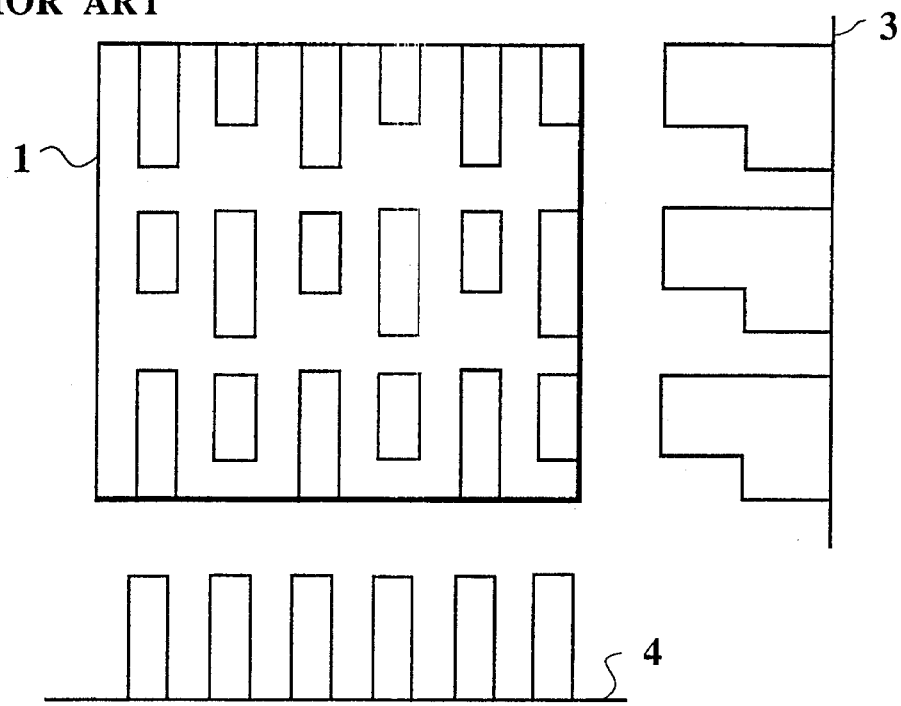
FIGS. 1(A) and 1(B) are illustration of a designed reference pattern and an observed pattern which are causing a period mismatching error in a conventional cumulative projection pattern comparison method.
Figure 1:
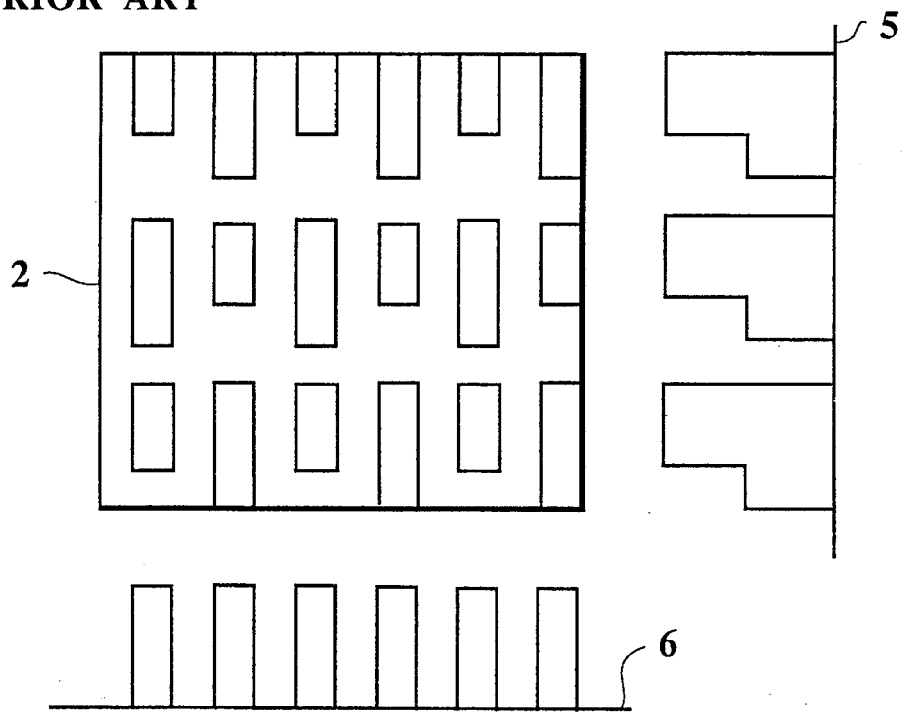
Figure 14:
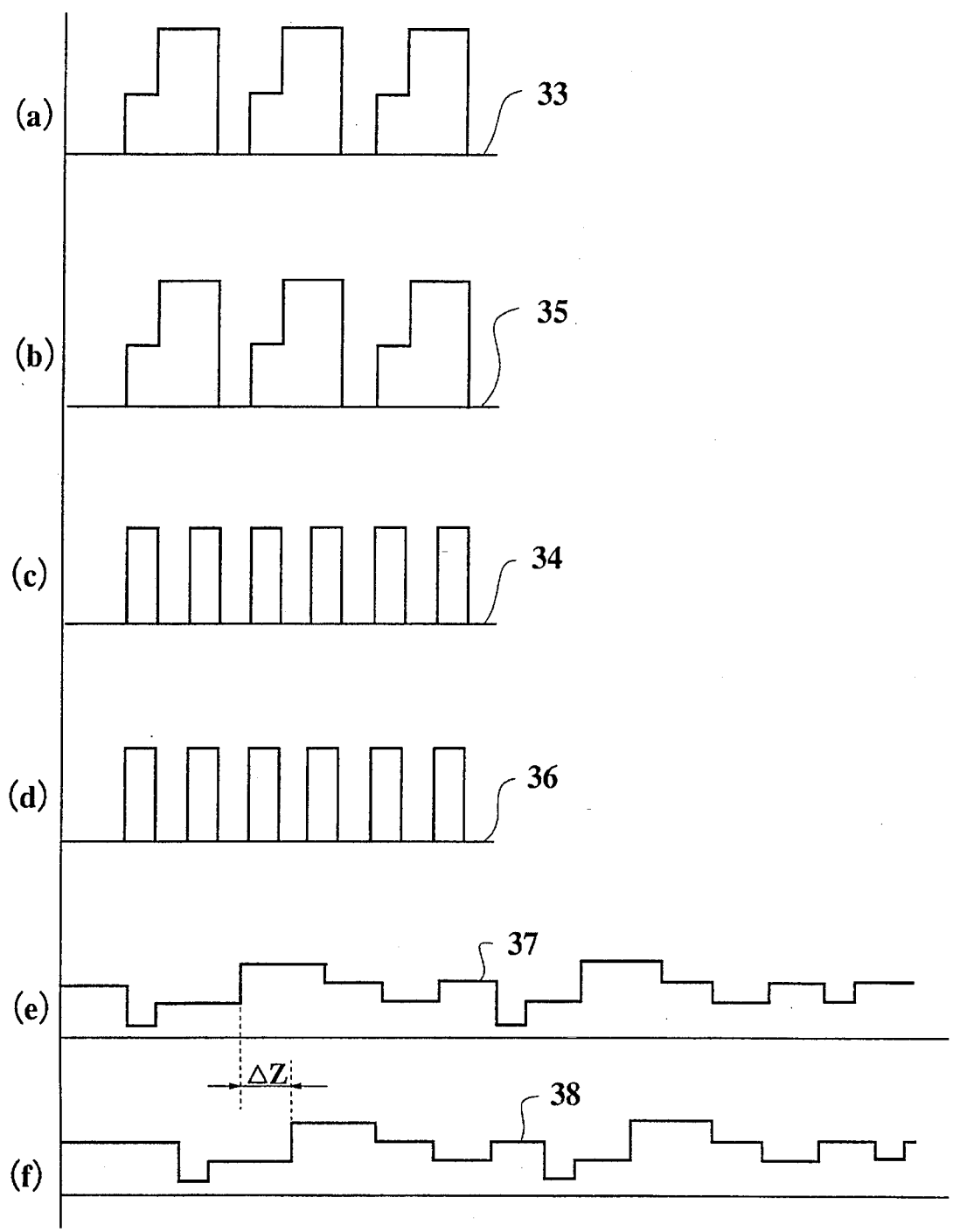
FIG. 14 is an illustration of X-, Y-, and oblique direction cumulative projection patterns for the designed reference and observed patterns of FIGS. 1(A) and 1(B) to be used in one embodiment of a displacement detection method according to the present invention.

Referring now to FIG. 14, one embodiment of an image displacement detection method according to the present invention will be described in detail. Here, the description will be given for a case of dealing with the designed reference pattern shown in FIG. 1(A) and the observed pattern shown in FIG. 1(B) as an example.

In FIG. 14, a part (a) shows an X-direction cumulative projection pattern 33 for the designed reference pattern 1 and a part (c) shows a Y-direction cumulative projection pattern 34 for the designed reference pattern 1, while a part (b) shows an X-direction cumulative projection pattern 35 for the observed pattern 2 and a part (d) shows a Y-direction cumulative projection pattern 36 for the observed pattern 2, and a part (e) shows a 45° oblique direction cumulative projection pattern 37 for the designed reference pattern 1 and a part (f) shows a 45° oblique direction cumulative projection pattern 38 for the observed pattern 2.

Now, putting an X-direction period of the designed reference pattern to be Tx, an X-direction fundamental displacement of the observed pattern to be dx, a Y-direction period of the designed reference pattern to be Ty, and a Y-direction fundamental displacement of the observed pattern to be dy, the X-direction and Y-direction displacements can be expressed, respectively, as $\Delta x = dx \pm mTx$ and $\Delta y = dy \pm nTy$, where m and n are integers.

Then, the 45° oblique direction displacement $\Delta z$ due to these X-direction and Y-direction displacements can be given by the following expression:

$$\Delta z = \sqrt{\Delta x^2 + \Delta y^2} \ast \cos(\tan^{-1}\Delta y/\Delta x - \theta)$$

where $\theta = \pi/4$.

Next, $\Delta z$ is calculated by substituting all the candidates for $\Delta x$ and $\Delta y$ in the above expression, and the 45° oblique direction cumulative projection pattern 38 for the observed pattern is displaced by the calculated $\Delta z$ and then compared with the 45° oblique direction cumulative projection pattern 37 for the designed reference pattern to obtain the discrepancy in the oblique direction. Here, the candidates for $\Delta x$ and $\Delta y$ are selected to be those for which the discrepancies in the X- and Y-directions become locally minimum. In the above, the discrepancy is given as a sum of a square of an absolute value of each difference resulting from each set of $\Delta x$ and $\Delta y$. The discrepancy in the oblique direction is small unless there is a period mismatching error. The actual size of the discrepancy depends on the pattern structure, but the case of the period mismatching error can easily be determined because of its relative largeness with respect to the other cases.

Then, the candidate $\Delta x$ and $\Delta y$ for which the discrepancy in the oblique direction becomes minimum or less than a prescribed critical value are judged to be the appropriate displacement of the observed pattern with respect to the designed reference pattern.

Thus, in this embodiment, it is possible to detect a displacement of a pattern in a two dimensional image accurately by using only a one-dimensional pattern matching, without any period mismatching error even for an image of a repetitious pattern.

The image displacement detection method described above can be carried out according to a procedure represented by the flow chart of FIG. 15, as follows.

First, the observed pattern is entered at the step 501, and the X-direction, Y-direction, and oblique direction cumulative projection patterns for the observed pattern are obtained at the step 502, while the designed reference pattern is entered at the step 503, and the X-direction, Y-direction, and oblique direction cumulative projection patterns for the designed reference pattern are obtained at the step 504.

Then, the relative positions of the X-direction and Y-direction cumulative projection patterns for the observed pattern and the designed reference pattern are changed in units of a prescribed amount at the step 505, and the discrepancies in the X- and Y-directions for each relative position are calculated at the step 506.

Next, the X- and Y-direction displacements Δx and Δy for which the obtained X- and Y-direction discrepancies are locally minimum among all the X- and Y-direction discrepancies calculated are selected at the step 507, and then the X- and Y-direction displacements Δx and Δy for which the obtained X- and Y-direction discrepancies which are smaller than a prescribed critical value are selected at the step 508.

Then, the X- and Y-direction displacements Δx and Δy selected at the steps 507 and 508 for which the obtained X- and Y-direction discrepancies are locally minimum and smaller than a prescribed critical value are taken as the candidate X- and Y-direction displacements, and the oblique direction displacement Δz is calculated from each of these X- and Y-direction candidate displacements Δx and Δy at the step 509.

Next, the oblique direction cumulative projection pattern 38 for the observed pattern is displaced by the calculated oblique direction displacement Δz at the step 510, and then compared with the oblique direction cumulative projection pattern 37 for the designed reference pattern to obtain the discrepancy in the oblique direction at the step 511.

Finally, the obtained discrepancy in the oblique direction which is smaller than another prescribed critical value is selected at the step 512, and such candidate X- and Y-direction displacements Δx and Δy which produced that oblique direction discrepancy are taken as the actual displacements of the observed pattern with respect to the designed reference pattern in the X- and Y-directions at the step 513.

The image displacement detection method described above can also be carried out according to a procedure represented by the flow chart of FIG. 16, as follows.

First, the observed pattern is entered at the step 601, and the X-direction, Y-direction, and oblique direction cumulative projection patterns for the observed pattern are obtained at the step 602, while the designed reference pattern is entered at the step 603, and the X-direction, Y-direction, and oblique direction cumulative projection patterns for the designed reference pattern are obtained at the step 604.

Then, the relative positions of the X-direction and Y-direction cumulative projection patterns for the observed pattern and the designed reference pattern are changed in units of a prescribed amount at the step 605, and the discrepancies in the X- and Y-directions for each relative position are calculated at the step 606.

Next, the X- and Y-direction displacements Δx and Δy for which the obtained X- and Y-direction discrepancies are locally minimum among all the X- and Y-direction discrepancies calculated are selected at the step 607, and then the X- and Y-direction displacements Δx and Δy for which the obtained X- and Y-direction discrepancies are locally minimum are registered in a displacement candidate table as the candidate displacements at the step 608.

When as many of the candidate X- and Y-direction displacements Δx and Δy as $\Delta max/Tx \times \Delta max/Ty = \Delta^2 max/TxTy$ where Δmax is a maximum tolerable displacement are registered, the oblique direction displacement Δz is calculated from each of the registered candidate X- and Y-direction displacements Δx and Δy at the step 609, and the oblique direction cumulative projection pattern 38 for the observed pattern is displaced by the calculated oblique direction displacement Δz at the step 610, and then it is compared with the oblique direction cumulative projection pattern 37 for the designed reference pattern to obtain the discrepancy in the oblique direction at the step 611.

Finally, the candidate X- and Y-direction displacements Δx and Δy for which the obtained discrepancy in the oblique direction is minimum is selected out at the step 612, and these candidate X- and Y-direction displacements Δx and Δy are taken as the actual displacements of the observed pattern with respect to the designed reference pattern in the X- and Y-directions at the step 613.

In the procedures described above, the oblique direction cumulative projection pattern may be obtained immediately before the step 510 or the step 610 instead of obtaining at the steps 502 and 504 or the steps 602 and 604 as described.

Figure 15:
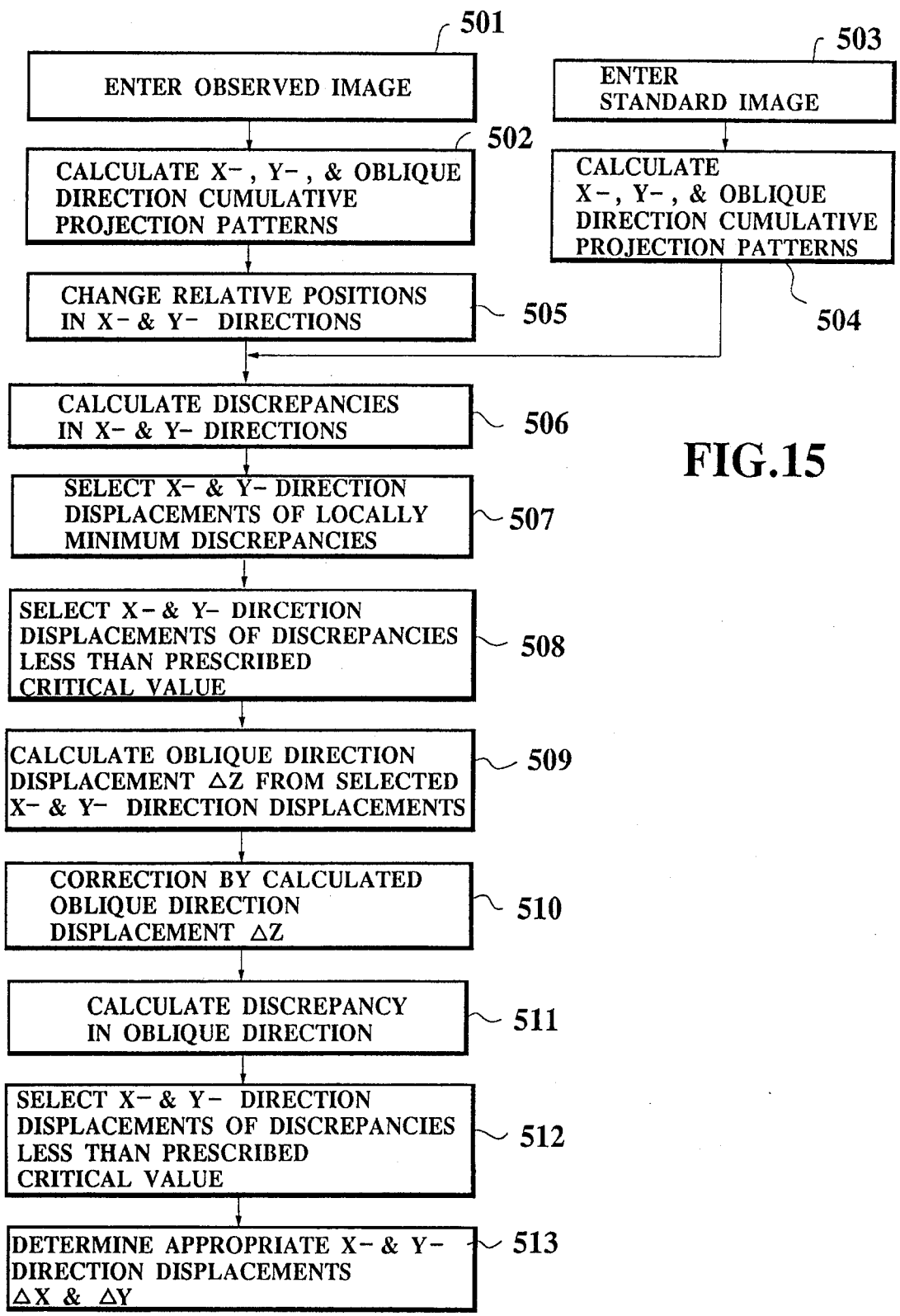
FIG. 15 is a flow chart of one possible procedure for one embodiment of a displacement detection method according to the present invention.
Figure 16:
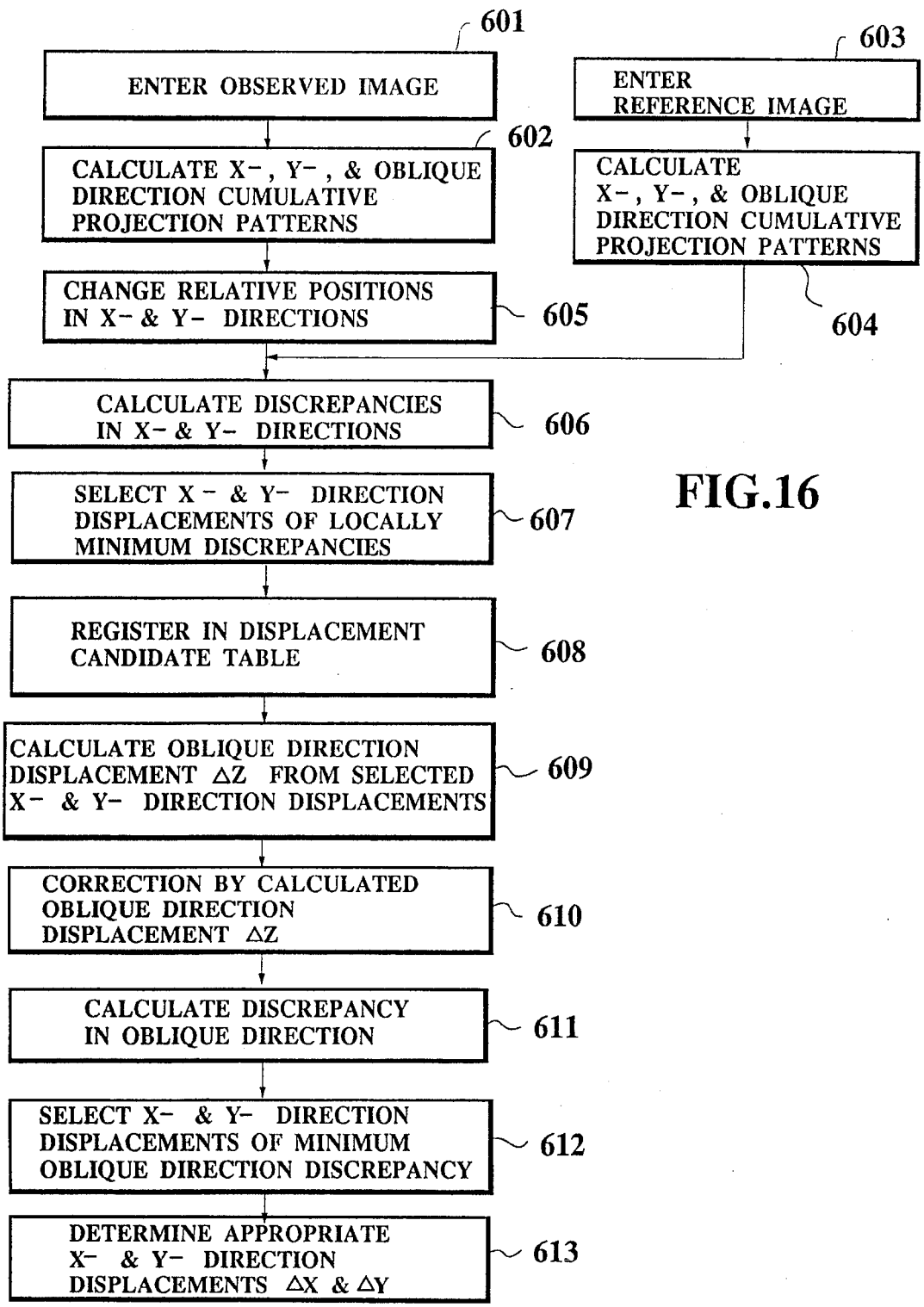
FIG. 16 is a flow chart of another possible procedure for one embodiment of a displacement detection method according to the present invention.

Also, the step 512 of FIG. 15 and the step 612 of FIG. 16 may be interchanged with each other, such that the condition of selecting the candidate X- and Y-direction displacements Δx and Δy for which the oblique discrepancy is minimum may be replaced by the condition of selecting the candidate X- and Y-direction displacements Δx and Δy for which the oblique direction discrepancy is smaller than a prescribed critical value, or vice versa.

It is also to be noted that in this embodiment of the image displacement detection method, the observed and designed reference images may be given in forms of gradation images rather than binary images, although the evaluation of the discrepancy becomes cumbersome when there is a large concentration level difference between the observed image and the designed reference image in a case the gradation images are used.

Moreover, the angle of inclination θ for the oblique direction can be any angle except for 0 and π/2 in principle, although π/4 is practically most preferable.

Figure 17:
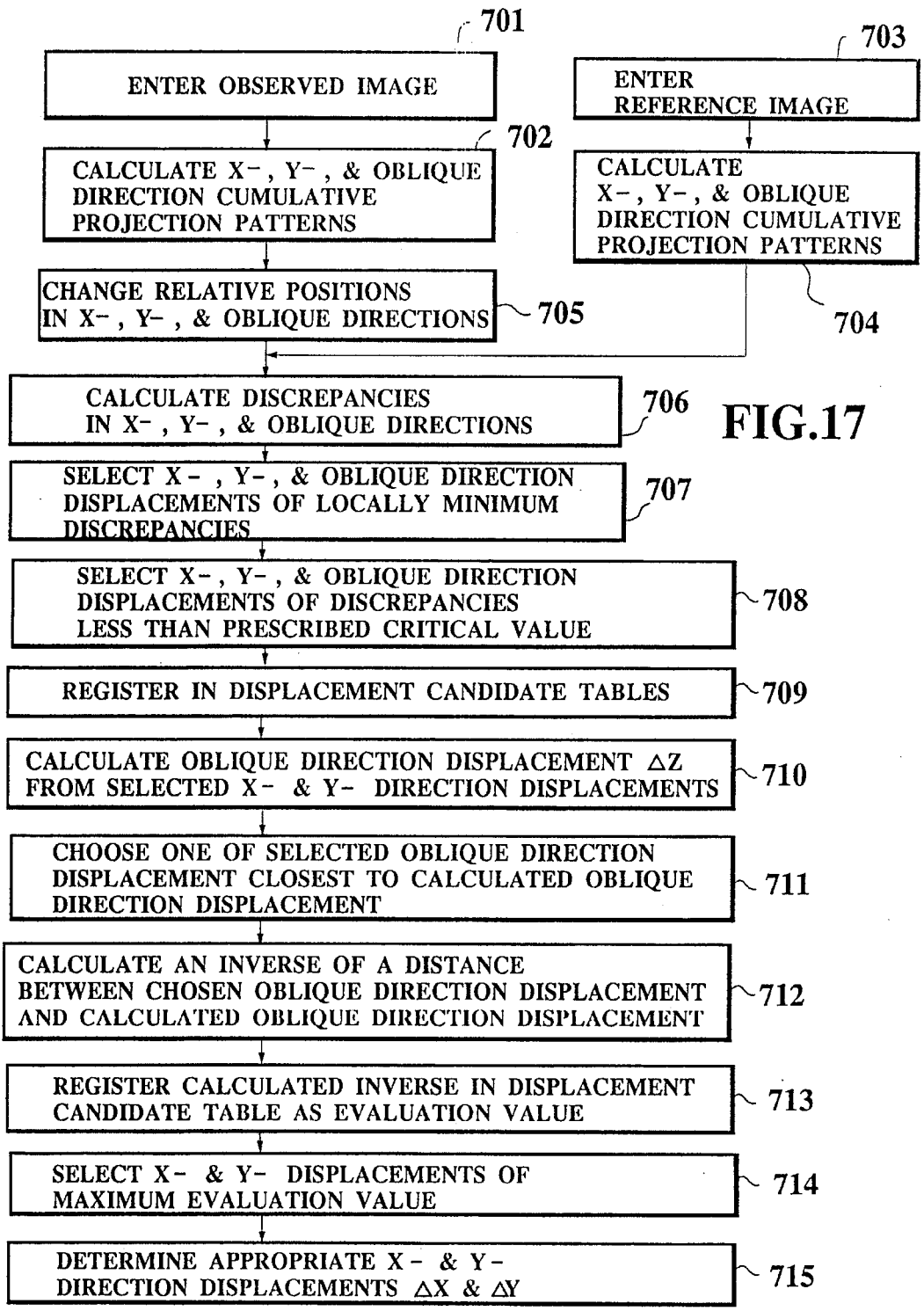
FIG. 17 is a flow chart of one possible procedure for another embodiment of a displacement detection method according to the present invention.

Referring now to FIG. 17, another embodiment of an image displacement detection method according to the present invention will be described in detail. Here, as in the previous embodiment, the description will be given for a case of dealing with the designed reference pattern shown in FIG. 1(A) and the observed pattern shown in FIG. 1(B) as an example.

In this embodiment, the image displacement detection method of the previous embodiment is modified for the purpose of easier hardware implementation. More specifically, in this embodiment, the image displacement detection method is to be carried out according to a procedure represented by the flow chart of FIG. 17, as follows.

First, the observed pattern is entered at the step 701, and the X-direction, Y-direction, and oblique direction cumulative projection patterns for the observed pattern are obtained at the step 702, while the designed reference pattern is entered at the step 703, and the X-direction, Y-direction, and oblique direction cumulative projection patterns for the designed reference pattern are obtained at the step 704.

Then, the relative positions of the X-, Y-, and oblique direction cumulative projection patterns for the observed pattern and the designed reference pattern are changed in units of a prescribed amount at the step 705, and the discrepancies in the X-, Y-, and oblique directions for each relative position are calculated at the step 706.

Next, the X, Y-, and oblique direction displacements Δx, Δy, and Δz for which the obtained X-, Y-, and oblique direction discrepancies which are locally minimum among all the X-, Y-, and oblique direction discrepancies calculated are selected at the step 707, and the X-, Y-, and oblique direction displacements Δx, Δy, and Δz for which the obtained X-, Y-, and oblique direction discrepancies which are smaller than a prescribed critical value are selected at the step 708, and then the selected X-, Y-, and oblique direction displacements Δx, Δy, and Δz for which the obtained discrepancies are locally minimum and less than a prescribed critical value are registered in a displacement candidate table as the candidate displacements at the step 709.

Next, the oblique direction displacement $\Delta z$ is calculated from each of the registered candidate X- and Y-direction displacements $\Delta x$ and $\Delta y$ at the step 710, and one of the selected oblique direction displacement $\Delta z$ registered in the displacement candidate table which is closest to the calculated oblique direction displacement $\Delta z$ is chosen at the step 711. Then, an inverse 1/d of a distance d between the chosen oblique direction displacement $\Delta z$ and the calculated oblique direction displacement $\Delta z$ is calculated at the step 712, and this calculated inverse 1/d is registered in the displacement candidate table as an evaluation value that chosen oblique direction displacement $\Delta z$ at the step 718.

Finally, the candidate X- and Y-direction displacements $\Delta x$ and $\Delta y$ for which the evaluation value of the corresponding oblique direction displacement $\Delta z$ registered in the candidate displacement table is maximum is selected out at the step 714, and these candidate X- and Y-direction displacements $\Delta x$ and $\Delta y$ are taken as the actual displacements of the observed pattern with respect to the designed reference pattern in the X- and Y-directions at the step 715.

Thus, in this embodiment, it is possible to detect a displacement of a pattern in a two dimensional image accurately by using only a one-dimensional pattern matching, without any period mismatching error even for an image of a repetitious pattern, just as in the previous embodiment.

In this procedure of FIG. 17, the inverse 1/d of the distance d between the chosen oblique direction displacement $\Delta z$ and the calculated oblique direction displacement $\Delta z$ calculated at the step 712 may be replaced by any function of this distance d.

Also, a processing time of this procedure of FIG. 17 may be shortened by setting a certain critical value for this distance d, and determining the X- and Y-direction displacements $\Delta x$ and $\Delta y$ as those for which this distance d is lower than that critical value as soon as such X- and Y-direction displacements $\Delta x$ and $\Delta y$ are found, so that the remaining calculations for the other candidate X- and Y-direction displacements can be omitted, instead of the steps 713 to 715 described above.

Also, as in the previous embodiment, the observed and designed reference images may be given in forms of gradation images rather than binary images, and the angle of inclination $\theta$ for the oblique direction can be any angle except for 0 and $\pi/2$ in principle, although $\pi/4$ is practically most preferable.

Besides those already mentioned, many modifications and variations of the embodiments described above may be made without departing from the novel and advantageous features of the present invention. Accordingly, all such modifications and variations are intended to be included within the scope of the appended claims.

What is claimed is:

1. A thresholding method for segmenting a gray scale image, comprising the steps of:

(a) scanning the gray scale image with a window over successive window positions;

(b) calculating a concentration level of the gray scale image within the window at each of the successive window positions in the scanning of the step (a);

(c) obtaining concentration histograms for the gray scale image within the window at the window position at which the concentration level satisfies a prescribed upper level condition and at the window position at which the concentration level satisfies a prescribed lower level condition, where the prescribed upper level condition is that a mean concentration of the gray scale image within the window is greater than a prescribed upper critical value, and the prescribed lower level condition is that the mean concentration is less than a prescribed lower level critical value;

(d) obtaining a histogram difference of the concentration histograms obtained at the step (c);

(e) determining a zero-cross point of the histogram difference obtained at the step (d); and (f) segmenting the input image by using the zero-cross point determined at the step (e) as a threshold to obtain a segmented image.

2. The thresholding method of claim 1, wherein at the step (b) the concentration level of the gray scale image within the window is given by a mean concentration of the gray scale image within the window.

3. The thresholding method of claim 1, wherein at the step (b) the concentration level of the gray scale image within the window is given by a total sum of concentrations in the gray scale image within the window.

4. The thresholding method of claim 1, wherein at the step (c) the prescribed upper level condition is that a mean concentration of the gray scale image within the window is maximum, and the prescribed lower level condition is that the mean concentration is minimum.

5. The thresholding method of claim 1, wherein the calculation of the concentration level at the step (b) is carried out at each of the successive window positions concurrently with the scanning over each of the successive window positions at the step (a), and the scanning of the step (a) and the calculation of the step (b) are terminated as soon as the window position at which the concentration level satisfies a prescribed upper level condition and the window position at which the concentration level satisfies a prescribed lower level condition are obtained.

6. The thresholding method of claim 1, wherein at the step (e) the zero-cross point is determined as a center of gravity of the histogram difference.

7. The thresholding method of claim 1, wherein at the step (e) the zero-cross point is determined as a point of symmetry of the histogram difference.

8. The thresholding method of claim 1, wherein at the step (e), in a case a curve for the histogram difference is crossing a zero level at more than one points, the zero-cross point is approximated by a middle point of a distribution of said more than one points at which the curve for the histogram difference is crossing the zero level in the histogram difference.

9. The thresholding method of claim 1, wherein at the step (e) the zero-cross point is determined after a curve for the histogram difference is approximated by using a curve approximation method.

10. The thresholding method of claim 1, wherein at the step (e) the histogram difference from which the zero-cross point is determined excludes such exceptional cases in which the histogram difference has an area less than a prescribed critical area.

11. The thresholding method of claim 1, wherein at the step (e) the histogram difference from which the zero-cross point is determined excludes such exceptional cases in which the histogram difference is obtained from the concentration histograms for two window positions at both of which the gray scale image within the window is entirely a background portion of the gray scale image, and in which the histogram difference is obtained from the concentration histograms for two window positions at both of which the gray scale image within the window is entirely a pattern portion of the gray scale image.

12. A method of determining a background concentration distribution for a gray scale image, comprising the steps of:

(a) scanning the gray scale image with two windows over successive window positions;

(b) obtaining a concentration histogram for the gray scale image within each of said two windows at each window position;

(c) obtaining a histogram difference of the concentration histograms for said two windows at said each window position obtained at the step (b);

(d) determining one of a peak concentration and a mean value concentration of a low concentration section of the histogram difference obtained at the step (c);

(e) calculating an off-set as a difference between said one of the peak concentration and the mean value concentration determined at the step (d) for one window position and said one of the peak concentration and the mean value concentration determined for another window position in a vicinity of said one window position at which the gray scale image within said two windows is entirely a background portion of the gray scale image;

(f) determining a background concentration level for said each window position from said one of the peak concentration and the mean value concentration determined at the step (d), wherein the background concentration level is determined as a sum of the off-set determined at the step (e) and said one of the peak concentration and the mean value concentration determined at the step (d);

(g) constructing a background concentration distribution map from the background concentration levels determined at the step (e).

13. The method of claim 12, wherein at the step (d) the histogram difference from which said one of the peak concentration and the mean value concentration is determined excludes such exceptional cases in which the histogram difference has an area less than a prescribed critical area.

14. The method of claim 12, wherein at the step (d) the histogram difference from which said one of the peak concentration and the mean value concentration is determined excludes such exceptional cases in which the histogram difference is obtained from the concentration histograms for two window positions at both of which the gray scale image within the window is entirely a background portion of the gray scale image, and in which the histogram difference is obtained from the concentration histograms for two window positions at both of which the gray scale image within the window is entirely a pattern portion of the gray scale image.

15. The method of claim 12, further comprising the step of:

(h) determining the background concentration level for such positions at which the gray scale image within the window is entirely a background portion of the gray scale image as said one of the peak concentration and the mean value concentration of the concentration histogram obtained at the step (b) for said positions.

16. The method of claim 12, wherein said two windows are closely attached with each other.

17. The method of claim 12, wherein said two windows are partially overlapping with each other.

18. The method of claim 12, wherein said two windows are arranged to be located nearby but separated from each other by a predetermined distance.

* * * * *